United States Patent
Elsahar et al.

(10) Patent No.: US 11,494,564 B2
(45) Date of Patent: Nov. 8, 2022

(54) UNSUPERVISED ASPECT-BASED MULTI-DOCUMENT ABSTRACTIVE SUMMARIZATION

(71) Applicant: NAVER CORPORATION, Gyeonggi-do (KR)

(72) Inventors: Hady Elsahar, Grenoble (FR); Maximin Coavoux, Grenoble (FR); Matthias Galle, Eybens (FR)

(73) Assignee: NAVER CORPORATION, Gyeonggi-Do (KR)

( * ) Notice: Subject to any disclaimer, the term of this patent is extended or adjusted under 35 U.S.C. 154(b) by 294 days.

(21) Appl. No.: 16/832,841

(22) Filed: Mar. 27, 2020

(65) Prior Publication Data

US 2021/0303796 A1    Sep. 30, 2021

(51) Int. Cl.
| | | |
|---|---|---|
| *G06F 3/048* | (2013.01) | |
| *G06F 40/30* | (2020.01) | |
| *G06N 3/04* | (2006.01) | |
| *G06F 40/166* | (2020.01) | |
| *G06F 16/93* | (2019.01) | |

(Continued)

(52) U.S. Cl.
CPC ............ *G06F 40/30* (2020.01); *G06F 16/93* (2019.01); *G06F 16/953* (2019.01); *G06F 40/166* (2020.01); *G06N 3/0445* (2013.01); *G06N 3/0454* (2013.01); *G06N 3/08* (2013.01)

(58) Field of Classification Search
CPC ........ G06F 40/30; G06F 16/93; G06F 16/953; G06F 40/166; G06N 3/0445; G06N 3/0454; G06N 3/08
See application file for complete search history.

(56) References Cited

U.S. PATENT DOCUMENTS

| 10,402,723 B1* | 9/2019 | Silberman | .............. | G06N 3/006 |
| 10,776,566 B2* | 9/2020 | DeVries | ................ | G06F 40/284 |
| 10,839,223 B1* | 11/2020 | Jiang | ...................... | G06V 10/82 |

(Continued)

OTHER PUBLICATIONS

Angela Fan, Mike Lewis, and Yann Dauphin. 2018. Hierarchical neural story generation. In Proceedings of the 56th Annual Meeting of the Association for Computational Linguistics (vol. 1: Long Papers), pp. 889-898, Melbourne, Australia. Association for Computational Linguistics.

(Continued)

*Primary Examiner* — David Phantana-angkool

(57) ABSTRACT

A multi-document summarization system includes: an encoding module configured to receive multiple documents associated with a subject and to, using a first model, generate vector representations for sentences, respectively, of the documents; a grouping module configured to group first and second ones of the sentences associated with first and second aspects into first and second groups, respectively; a group representation module configured to generate a first vector representation based on the first ones of the sentences and a second vector representation based on the second ones of the sentences; a summary module configured to: using a second model: generate a first sentence regarding the first aspect based on the first vector representation; and generate a second sentence regarding the second aspect based on the second vector representation; and store a summary including the first and second sentences in memory in association with the subject.

20 Claims, 7 Drawing Sheets

(51) Int. Cl.
    *G06F 16/953*     (2019.01)
    *G06N 3/08*     (2006.01)

(56) References Cited

U.S. PATENT DOCUMENTS

| | | | | |
|---|---|---|---|---|
| 11,270,085 | B2* | 3/2022 | Nakajima | G06N 5/046 |
| 2018/0285348 | A1* | 10/2018 | Shu | G06F 40/30 |
| 2019/0034986 | A1* | 1/2019 | Robinson | G06Q 30/0282 |
| 2020/0125673 | A1* | 4/2020 | Aharonov | G06N 3/0454 |
| 2020/0311207 | A1* | 10/2020 | Kim | G06F 40/30 |
| 2021/0019370 | A1* | 1/2021 | Andrassy | G06N 3/084 |
| 2021/0034988 | A1* | 2/2021 | Adel-Vu | G06N 3/0445 |
| 2021/0081503 | A1* | 3/2021 | Tran | G06N 3/08 |
| 2021/0103626 | A1* | 4/2021 | Jolly | G06F 16/345 |
| 2021/0303796 | A1* | 9/2021 | Elsahar | G06F 40/30 |

OTHER PUBLICATIONS

Chin-Yew Lin. 2004. ROUGE: A package for automatic evaluation of summaries. In Text Summarization Branches Out, pp. 74-81, Barcelona, Spain. Association for Computational Linguistics.

David M. Blei, Andrew Y. Ng, and Michael I. Jordan. 2003. Latent dirichlet allocation. Journal of Machine Learning Research, 3:993-1022.

Demian Gholipour Ghalandari. 2017. Revisiting the centroid-based method: A strong baseline for multi-document summarization. In Proceedings of the Workshop on New Frontiers in Summarization, pp. 85-90, Copenhagen, Denmark. Association for Computational Linguistics.

Dragomir R. Radev, Hongyan Jing, Magorzata Sty, and Daniel Tam. 2004. Centroid-based summarization of multiple documents. Information Processing and Management, 40(6):919-938.

Eric Chu and Peter Liu. 2019. Meansum: a neural model for unsupervised multi-document abstractive summarization, pp. 1223-1232.

Federico Barrios, Federico L'opez, Luis Argerich, and Rosa Wachenchauzer. 2016. Variations of the similarity function of textrank for automated summarization. CoRR, abs/1602.03606.

Gaetano Rossiello, Pierpaolo Basile, and Giovanni Semeraro. 2017. Centroid-based text summarization through compositionality of word embeddings. In Proceedings of the MultiLing 2017 Workshop on Summarization and Summary Evaluation Across Source Types and Genres, pp. 12-21, Valencia, Spain. Association for Computational Linguistics.

Günes Erkan and Dragomir R. Radev. 2004. Lexrank: Graph-based lexical centrality as salience in text summarization. Journal of Artificial Intelligence Research, 22(1):457-479.

Julian McAuley, Christopher Targett, Qinfeng Shi, and Anton van den Hengel. 2015. Image-based recommendations on styles and substitutes. In Proceedings of the 38th International ACM SIGIR Conference on Research and Development in Information Retrieval, SIGIR '15, pp. 43-52, New York, NY, USA. ACM.

Kavita Ganesan, ChengXiang Zhai, and Jiawei Han. 2010. Opinosis: A graph based approach to abstractive summarization of highly redundant opinions. In Proceedings of the 23rd International Conference on Computational Linguistics (Coling 2010), pp. 340-348, Beijing, China. Coling 2010 Organizing Committee.

MirTafseer Nayeem, Tanvir Ahmed Fuad, and Yllias Chali. 2018. Abstractive unsupervised multidocument summarization using paraphrastic sentence fusion. In Proceedings of the 27th International Conference on Computational Linguistics, pp. 1191-1204, Santa Fe, New Mexico, USA. Association for Computational Linguistics.

Rada Mihalcea and Paul Tarau. 2004. TextRank: Bringing order into text. In Proceedings of EMNLP 2004, pp. 404-411, Barcelona, Spain. Association for Computational Linguistics.

Rich Caruana. 1997. Multitask learning. Machine Learning, 28(1):41-75.

Ruidan He, Wee Sun Lee, Hwee Tou Ng, and Daniel Dahlmeier. 2017. An unsupervised neural attention model for aspect extraction. In Proceedings of the 55th Annual Meeting of the Association for Computational Linguistics (vol. 1: Long Papers), pp. 388-397, Vancouver, Canada. Association for Computational Linguistics.

Stefanos Angelidis and Mirella Lapata. 2018. Summarizing opinions: Aspect extraction meets sentiment prediction and they are both weakly supervised. In Proceedings of the 2018 Conference on Empirical Methods in Natural Language Processing, pp. 3675-3686, Brussels, Belgium. Association for Computational Linguistics.

* cited by examiner

UNSUPERVISED ASPECT-BASED MULTI-DOCUMENT ABSTRACTIVE SUMMARIZATION

FIELD

The present disclosure relates to systems and methods for producing summaries of multiple documents without supervision.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, answer a question, etc.

SUMMARY

In a feature, a multi-document summarization system includes: an encoding module configured to receive multiple documents associated with a subject and to, using a first model, generate vector representations for sentences, respectively, of the documents; a grouping module configured to group first ones of the sentences associated with a first aspect into a first group and group second ones of the sentences associated with a second aspect into a second group, where the first and second aspects are different; a group representation module configured to generate a first vector representation based on the first ones of the sentences of the first group and a second vector representation based on the second ones of the sentences of the second group; a summary module configured to: using a second model: generate a first sentence regarding the first aspect based on the first vector representation; and generate a second sentence regarding the second aspect based on the second vector representation; and store a summary including the first and second sentences in memory in association with the subject.

In further features: the grouping module is further configured to group third ones of the sentences associated with a third aspect into a third group, where the first, second, and third aspects are different; the group representation module is further configured to generate a third vector representation based on the third ones of the sentences of the third group; and the summary module is further configured to: using the second model: generate a third sentence regarding the third aspect based on the third vector representation; and generate a third sentence regarding the third aspect based on the third vector representation; and store the summary further including the third sentence.

In further features, the first model is a long short term memory (LSTM) model.

In further features, the second model is a long short term memory (LSTM) model.

In further features, the first and second models are long short term memory (LSTM) models.

In further features, weights of the first and second models are trained jointly.

A training system includes: the multi-document summarization system; and a training module configured to jointly train weights of the first and second models using based on a training dataset.

In further features, the grouping module is configured to: for a sentence, based on the vector representation of the sentence, determine first and second probabilities of the sentence being associated with the first and second aspects, respectively; when the first probability is greater than the second probability, group the sentence into the first group; and when the second probability is greater than the first probability, group the sentence into the second group.

In further features, the group representation module is configured to: for the first ones of the sentences, determine probabilities that the first ones of the sentences, respectively, reflect a sentiment regarding the first aspect; select a first k of the first ones of the sentences with the highest probabilities of reflecting the sentiment regarding the first aspect, where is an integer greater than one; and generate the first vector representation based on the first k ones of the first ones of the sentences.

In further features, the group representation module is further configured to: for the second ones of the sentences, determine probabilities that the second ones of the sentences, respectively, reflect a sentiment regarding the second aspect; select a second k of the second ones of the sentences with the highest probabilities of reflecting the sentiment regarding the second aspect; and generate the second vector representation based on the second k ones of the second ones of the sentences.

In further features, the subject is one of a business, a product, and a point of interest.

In further features, the first aspect includes one of price, quality, and ease of use.

In a feature, a search system includes: the multi-document summarization system; and a search module that receives a query regarding the subject from a computing device over a network, that retrieves the summary associated association with the subject from the memory, and that transmits the summary to the computing device over the network.

In a feature, a system includes: the search system; and the computing device, where the computing device is configured to the summary.

In further features, the computing device is configured to at least one of: audibly output the summary via a speaker; and visibly output the summary on a display.

In further features: the encoding module is further configured to receive second documents associated with a second subject that is different than the subject and to, using the first model, generate second vector representations for second sentences, respectively, of the second documents; the grouping module is further configured to group third ones of the second sentences associated with the first aspect into a third group and group fourth ones of the second sentences associated with the second aspect into a fourth group; the group representation module is further configured to generate a third vector representation based on the third ones of the second sentences of the third group and a fourth vector representation based on the fourth ones of the second sentences of the fourth group; the summary module is further configured to: using the second model: generate a third sentence regarding the first aspect based on the third vector representation; and generate a fourth sentence regarding the second aspect based on the fourth vector representation; and store a second summary including the third and fourth sentences in the memory in association with the second subject.

In a feature, a multi-document summarization method includes: receiving multiple documents associated with a subject; using a first model, generating vector representations for sentences, respectively, of the documents; grouping first ones of the sentences associated with a first aspect into a first group; grouping second ones of the sentences associated with a second aspect into a second group, where the first and second aspects are different; generating a first vector representation based on the first ones of the sentences of the first group and a second vector representation based on the second ones of the sentences of the second group; using a second model: generating a first sentence regarding the first aspect based on the first vector representation; and generating a second sentence regarding the second aspect based on the second vector representation; and storing a summary including the first and second sentences in memory in association with the subject.

In further features, the multi-document summarization method further includes: jointly training weights of the first and second models using based on a training dataset.

In further features, the multi-document summarization method further includes: receiving a query regarding the subject from a computing device over a network; retrieving the summary associated association with the subject from the memory; and transmitting the summary to the computing device over the network.

In a feature, a multi-document summarization system includes: a means for receiving multiple documents associated with a subject and to, using a first model, generate vector representations for sentences, respectively, of the documents; a means for grouping first ones of the sentences associated with a first aspect into a first group and grouping second ones of the sentences associated with a second aspect into a second group, where the first and second aspects are different; a means for generating a first vector representation based on the first ones of the sentences of the first group and a second vector representation based on the second ones of the sentences of the second group; a means for: using a second model: generating a first sentence regarding the first aspect based on the first vector representation; and generating a second sentence regarding the second aspect based on the second vector representation; and storing a summary including the first and second sentences in memory in association with the subject.

In a feature, a multi-document summarization method includes: (a) receiving multiple documents associated with a subject; (b) clustering sentences in the multiple documents by: (b1) using a first model, generating vector representations for sentences, respectively, of the documents; (b2) grouping first ones of the sentences associated with a first aspect into a first group; and (b3) grouping second ones of the sentences associated with a second aspect into a second group, where the first and second aspects are different; (c) aggregating the clustered sentences by generating a first vector representation based on the first ones of the sentences of the first group and a second vector representation based on the second ones of the sentences of the second group; (d) summarizing the multiple documents using a second model by: (d1) generating a first sentence regarding the first aspect based on the first vector representation; and (d2) generating a second sentence regarding the second aspect based on the second vector representation; and (e) storing a summary including the first and second sentences in memory in association with the subject.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Reviews associated with a subject (e.g., a product, a business, a point of interest, etc.) can be numerous. The number of reviews associated with a subject can be so large that no user may read all reviews associated with the subject. Some reviews may include factual inaccuracies. Reviews may also include contradictory statements.

The present application involves generating summaries of multiple documents (e.g., reviews) associated with a subject. The summary includes one sentence per aspect (e.g., price, quality, ease of use, value, etc.) regarding the subject of the documents. The sentence generated regarding an aspect is generated based on sentences of the documents regarding that aspect.

A summarization module (1) computes vector representations of the sentences of the documents, (2) clusters the sentence representations into groups (e.g., clusters together sentences that are about the same aspect), (3) computes a single vector representation for each cluster from the representations of the sentences in that cluster, and (4) generates a sentence for each cluster/aspects. The sentences generated for the clusters/aspects form the summary for the subject. The summaries provide short versions of the contents of the multiple documents, thus saving users time. Also, users may not be exposed to biased and/or fake opinions.

Figure 1:
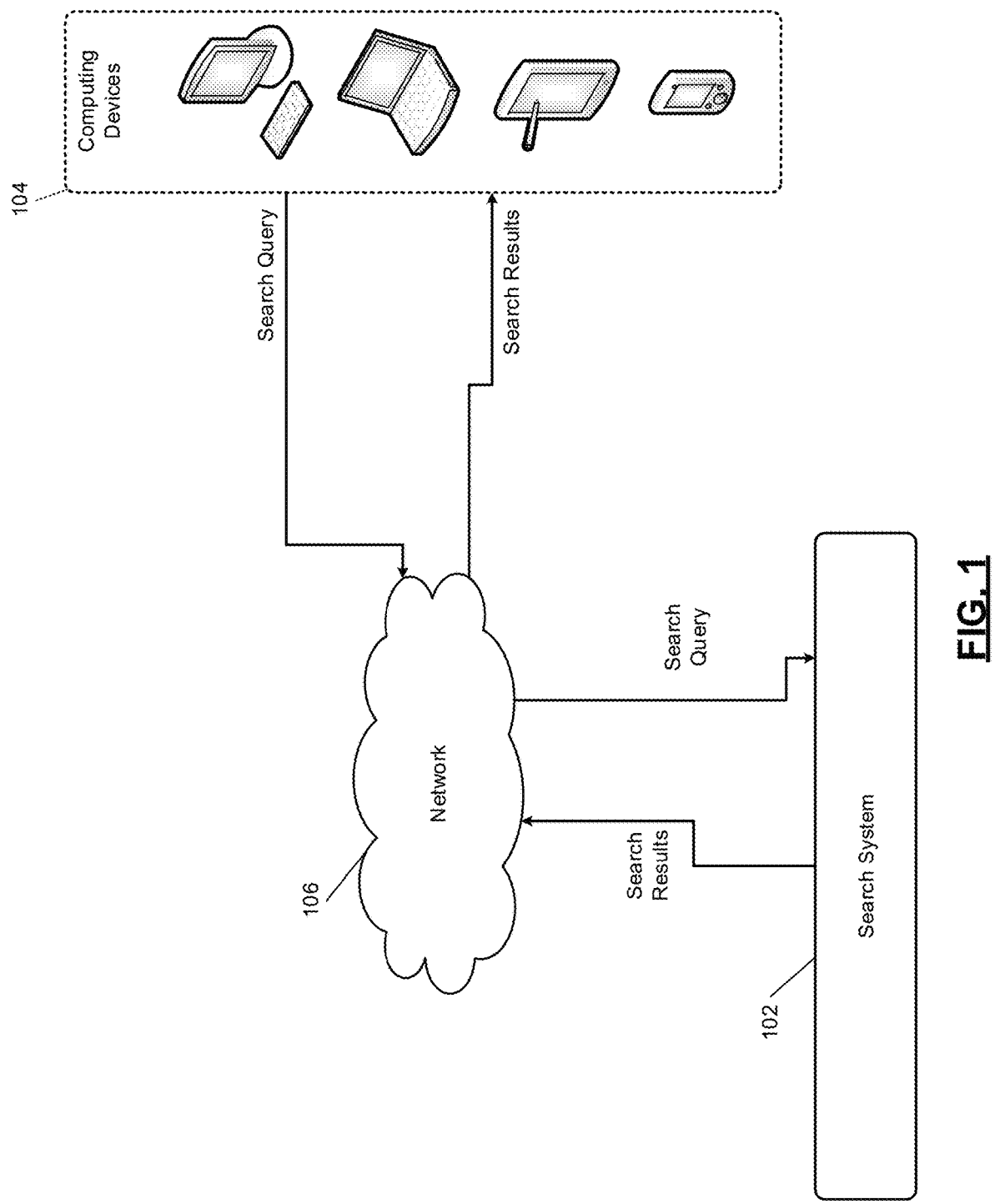
FIG. 1 includes a functional block diagram of an example environment including a search system configured to provide search results in response to queries.

FIG. 1 includes a functional block diagram including a search system 102 configured to respond to queries. The search system 102 is configured to receive queries from one or more user computing device(s) 104 via a network 106. The queries may be, for example, text input to a computing device or audio input to a computing device.

The search system 102 performs searches based on the queries, respectively, to identify one or more search results. The search system 102 transmits the results back to the computing devices 104 that transmitted the queries, respectively. For example, the search system 102 may receive queries regarding a subject, such as a business, a point of interest, a product, etc. The search system 102 may provide results indicative of information regarding subjects to the computing devices 104.

The computing devices 104 output the results to users. For example, the computing devices 104 may display the results to users on displays of the computing devices or displays connected to the computing devices. Additionally or alternatively, the computing devices 104 may audibly output the results via one or more speakers. The computing devices 104 may also output other information to the users. For example, the computing devices 104 may output additional information related to the results, advertisements related to the results, and/or other information. The search system 102 and the computing devices 104 communicate via a network 106.

A plurality of different types of computing devices 104 are illustrated in FIG. 1. An individual user computing device may also be referred to herein as a computing device 104. The computing devices 104 include any type of computing devices that is configured to generate and transmit queries to the search system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 104 may use a variety of different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the search system 102 while running operating systems other than those operating systems described above, whether presently available or developed in the future.

In some examples, a computing device 104 may communicate with the search system 102 using an application installed on the computing device 104. In general, a computing device 104 may communicate with the search system 102 using any application that can transmit queries to the search system 102 to be responded to (with results) by the search system 102. In some examples, a computing device 104 may run an application that is dedicated to interfacing with the search system 102, such as an application dedicated to performing searching and providing search results. In some examples, a computing device 104 may communicate with the search system 102 using a more general application, such as a web-browser application. The application executed by a computing device 104 to communicate with the search system 102 may display a search field on a graphical user interface (GUI) in which the user may input queries. The user may input a query, for example, by adding text to a text field using a touchscreen or physical keyboard, a speech-to-text program, or other form of user input.

A text query entered into a GUI on a computing device 104 may include words, numbers, letters, punctuation marks, and/or symbols. In general, a query may be a request for information identification and retrieval from the search system 102. For example, a query including text may be directed to providing information regarding a subject (e.g., a business, point of interest, product, etc.) that most closely matches the text of the query.

A computing device 104 may receive results from the search system 102 that is responsive to the search query transmitted to the search system 102. In various implementations, the computing device 104 may receive and the search system 102 may transmit multiple results that are responsive to the search query or multiple items (e.g., entities) identified in a query. In the example of the search system 102 providing multiple results, the search system 102 may determine a confidence value (indicative of a likelihood of a result is the most relevant result to the query) for each of the results and provide the confidence values along with the results to the computing device 104. The computing device 104 may display more than one of the multiple results (e.g., all results having a confidence value that is greater than a predetermined value), only the result with the highest confidence value, the results having the N highest confidence values (where N is an integer greater than one), etc.

The computing device 104 may be running an application including a GUI that displays the result(s) received from the search system 102. The respective confidence value(s) may also be displayed, or the results may be displayed in order (e.g., descending) based on the confidence values. For example, the application used to transmit the query to the search system 102 may also present (e.g., display or speak) the received search results(s) to the user via the computing device 104. As described above, the application that presents the received result(s) to the user may be dedicated to interfacing with the search system 102 in some examples. In other examples, the application may be a more general application, such as a web-browser application.

The GUI of the application running on the computing device 104 may display the search result(s) to the user in a variety of different ways, depending on what information is transmitted to the computing device 104. In examples where the results include a list of results and associated confidence values, the search system 102 may transmit the list of results and respective confidence values to the computing device 104. In this example, the GUI may display the result(s) and the confidence value(s) to the user as a list of possible results.

In some examples, the search system 102, or another computing system, may transmit additional information to the computing device 104 such as, but not limited to, applications and/or other information associated with the results, the query, points of interest associated with the results, etc. This additional information may be stored in a data store and transmitted by the search system 102 to the computing device 104 in some examples. In examples where the computing device 104 receives the additional information, the GUI may display the additional information along with the result(s). In some examples, the GUI may display the results as a list ordered from the top of the screen to the bottom of the screen by descending confidence value. In some examples, the results may be displayed under the search field in which the user entered the query.

In some examples, the computing devices 104 may communicate with the search system 102 via another computing system. The other computing system may include a computing system of a third party that may leverage the search functionality of the search system 102. The other computing system may belong to a company or organization other than that which operates the search system 102. Example parties which may leverage the functionality of the search system 102 may include, but are not limited to, internet search providers and wireless communications service providers. The computing devices 104 may send queries to the search system 102 via the other computing system. The computing devices 104 may also receive results from the search system 102 via the other computing system. The other computing system may provide a user interface to the computing devices 104 in some examples and/or modify the user experience provided on the computing devices 104.

The computing devices 104 and the search system 102 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

As discussed further below, the results generated for a query include a summary for the subject of query. The summary is generated based on multiple different documents for the subject. Each document includes text regarding the subject. For example, the subject may have numerous reviews posted regarding the subject. The summary may be generated based on the reviews. The summary provides valuable information regarding the subject included in the numerous reviews without a user having to read each of the numerous reviews.

Figure 2:
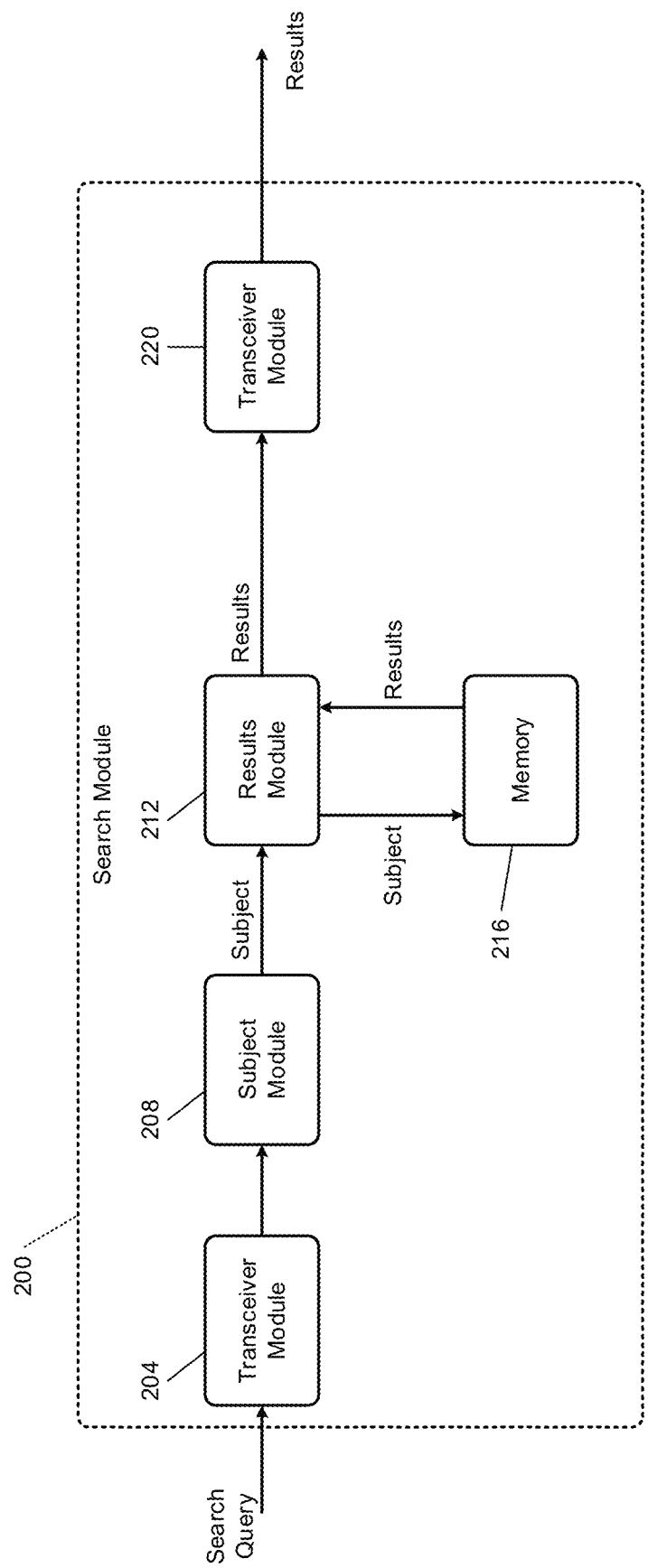
FIG. 2 is a functional block diagram including an example implementation of a search module of the search system.

FIG. 2 is a functional block diagram including an example implementation of a search module 200 of the search system 102. A first transceiver module 204 receives a query regarding a subject from a computing device 104. A subject module 208 parses the query and determines the subject of the query. As an example, the subject may be a business, a product, a point of interest, etc.

A results module 212 queries memory 216 for results regarding the subject. The results include a summary of multiple documents associated with the subject in the memory 216. The multiple documents may include, for example, multiple different text reviews (user reviews) posted regarding the subject. The results may also include other information associated with the subject in the memory 216. The summary stored for the subject may change as new documents are posted or otherwise provided regarding the subject.

A second transceiver module 220 transmits the determined results for the query back to the computing device 104 via the network 106. In various implementations, the second transceiver module 220 may be omitted, and the first transceiver module 204 may transmit the results back to the computing device 104 from which the query was received. The results include, for example, the (present) summary for the subject of the query.

Figure 3:
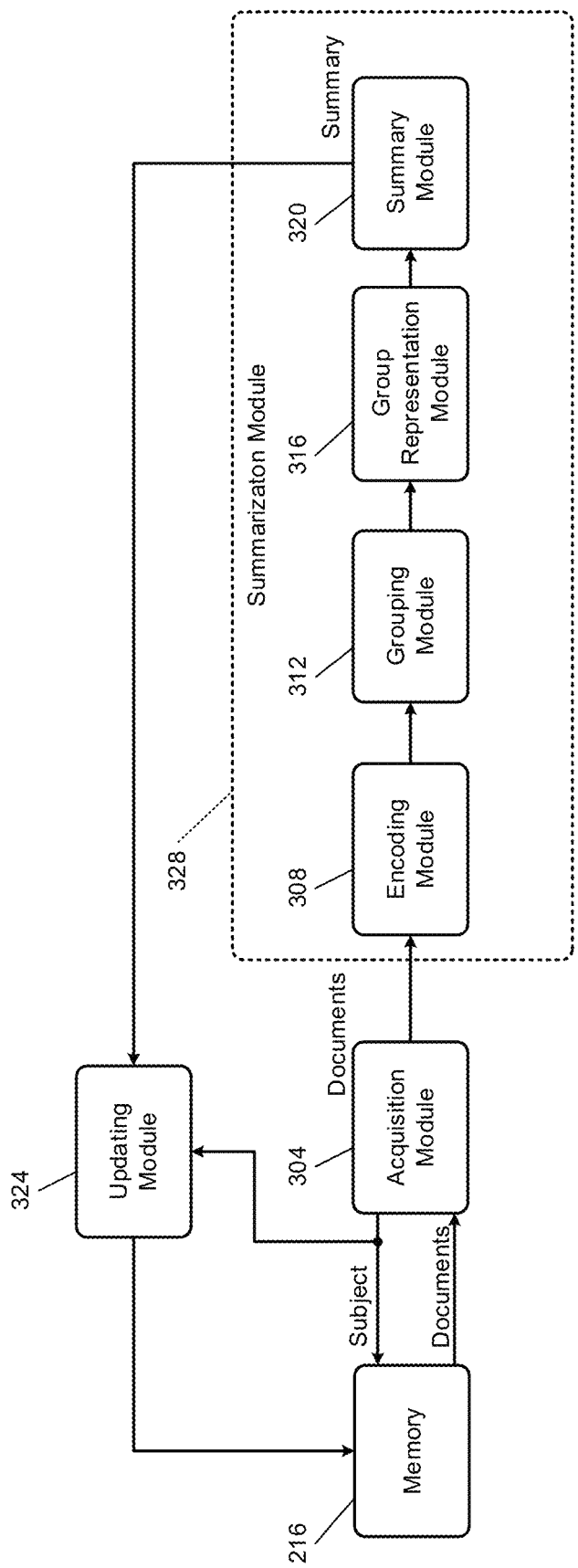
FIG. 3 is a functional block diagram of an example summary system that generates summaries for subjects of queries.

FIG. 3 is a functional block diagram of an example summary system that generates summaries for subjects of queries. An acquisition module 304 queries the memory 216 for documents associated with a subject. The acquisition module 304 may choose the subject randomly or in a predetermined order of possible subjects. For example, a list of subjects may be stored, and the acquisition module 304 may select the subjects from the list in the predetermined order. Examples of documents include reviews of the subject. The subject may be, for example, a business, a point of interest, a product, etc. The acquisition module 304 provides the documents associated with the subject to an encoding module 308.

The encoding module 308 encodes each sentence of each of the documents using a computer model, such as a long short term memory (LSTM) model, a convolutional neural network (CNN) model, a recurrent neural network (RNN) model, or another suitable type of computer model. The computer model is trained with a language model objective and/or a multi-task objective, for example, based on a review dataset including reviews associated with products listed on a predetermined website. In a multi-task objective, a classification objective may be included in addition to the language model objective. The encoding module 308 processes each sentence s using the computer model and retrieves the last state h of the computer model (e.g., the last LSTM state) as the result of the encoding of each sentence.

A grouping module 312 clusters the results from the encoding module 308 into aspects. Examples of aspects include, but are not limited to, price, quality, ease of use, customer service. In other words, the grouping module 312 sorts the sentences into different aspects such that sentences regarding the same aspect are clustered. The grouping module 312 uses a function $f_{aspect}$ that associates each sentence vector representations h (resulting from the encoding) to an aspect identifier $\alpha \in \{1, \ldots, n\}$, where n is the total number of aspects. The function $f_{aspect}$ may be instantiated, for example, by an unsupervised topic modelling function, an unsupervised aspect extraction function, a supervised aspect extraction function, or another suitable function. In various implementations, the function $f_{aspect}$ may be trained jointly with the computer model implemented by the encoding module 308.

The grouping module 312 may score possible aspects with a linear layer (e.g., a single linear layer) followed by a softmax activation. This may be described by the following $$p(A=\cdot|s_i)=\text{Softmax}(W^{(A)}\cdot h_i),$$

$$f_{aspect}=\text{argmax} p(A=a|s_i),$$

where $p(A=\cdot|s_i)$ is a probability that a sentence is associated with an aspect (A), $W^{(A)}$ is a parameter matrix, and $h_i$ is the sentence vector representation resulting from the encoding of the sentence $s_i$. The grouping module 312 may associate a sentence with the aspect having the highest probability. The grouping module 312 may perform the above for each sentence in each document based on that sentence's vector representation resulting from the encoding. In various implementations, k-means clustering may be used, k-means clustering is an unsupervised clustering whose (e.g., only) hyperparameter is a predefined number of clusters.

A group representation module 316 aggregates the clusters of sentences to generate a (single) vector representation $h^{(a)}$ for each aspect based on the sentences associated with that aspect, where the representation includes information from the original sentences regarding that aspect. For each cluster $C_a$, $C_a=\{(s_1, h_1), (s_2, h_2), \ldots, (s_{ka}, h_{ka})\}$ containing pairs (each including a sentence and its vector representation), the group representation module 316 computes a single representation $h^{(a)}$ that includes the information from the original sentences. The information from the original sentences may be selected, for example, based on importance. For example, the information with highest importance values may be selected. To do this, this group representation module 316 selects the most salient sentences from the cluster and computes the centroid of the selected sentences. The group representation module 316 may use the output of a polarity classifier to define saliency. For example, the group representation module 316 may define and determine the saliency score sal for a single sentence s as the prediction confidence of the classifier $$p(Pol=\cdot|s_i) = \text{Softmax}(W^{(Pol)}\cdot h_i),$$

$$sal(s_i) = \max_{pol} p(Pol=pol|s_i),$$

where $p(Pol=\cdot|s_i)$ is a probability that a sentence provides a sentiment associated with an aspect (A), $W^{(Pol)}$ is a parameter matrix, and $h_i$ is the sentence vector representation resulting from the encoding of the sentence $s_i$.

The group representation module 316 may select the k most salient sentences from each cluster $C' \subset C$. For example, the group representation module 316 may select the M sentences having the k highest probabilities. M is an integer greater than one.

The group representation module 316 may determine the centroid of each cluster based on the selected k most salient sentences of that cluster. For example, the group representation module 316 may determine the centroid ($c_a$) of a cluster using the following equation.

$$c_a = \frac{1}{C'} \sum_{(s_i,h_i)\in C'} h_i$$

The above can be considered a form of hard attention where a few items (the k sentences) are attended to while a majority of the items (in this case the remainder of the sentences) do not participate (and are not included) in the final representation.

A summary module 320 generates a sentence (summary) per cluster/aspect. The summary module 320 initializes the same computer model (as used in the encoding module 308) with cluster representation $c_a$ and performs decoding using the computer model, such as unsupervised, to produce a summary sentence for that cluster/aspect. The decoding may be based on top-k sample decoding. This may include, for example, at each time step, the summary module 320 extracts the k most probably tokens renormalizes their probabilities, and samples from the resulting distribution. The summary module 320 may perform the top-k sampling decoding K times and re-rank the generated sentences according to the cosine similarity of their representation the cluster representation $c_a$. This may ensure that the generated (summary) sentence has a semantic content that is consistent with that of the cluster/aspect. The summary module 320 does this for each cluster/aspect. The resulting (summary) sentences are combined to generate a complete summary regarding each aspect for the subject. The weights of the computer model of the summary module 320 may be shared with (i.e., the same as) the weights of the computer model used by the encoding module 308. The weights of both models may be trained jointly (i.e., together) during training.

An updating module 324 stores the generated summary in association with the subject in the memory 216. The summary can then be provided in response to a query regarding the subject. The updating module 324 may also store additional documents received regarding the subject in the memory 216 in association with the subject. The summary can be updated over time by a summarization module 328 to reflect original and added documents stored in associated with the subject.

Figure 4:
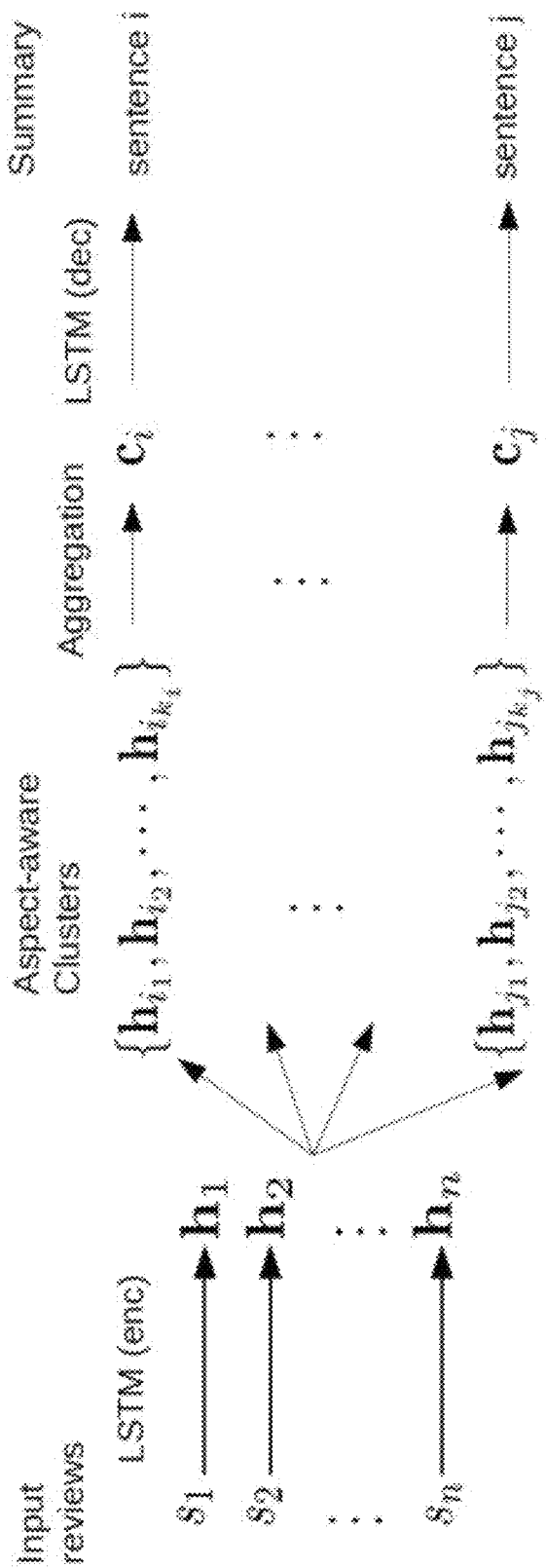
FIG. 4 is an example diagram illustrative of the summarization of multiple documents.

FIG. 4 is an example diagram illustrative of the summarization of multiple documents described above.

Figure 5:
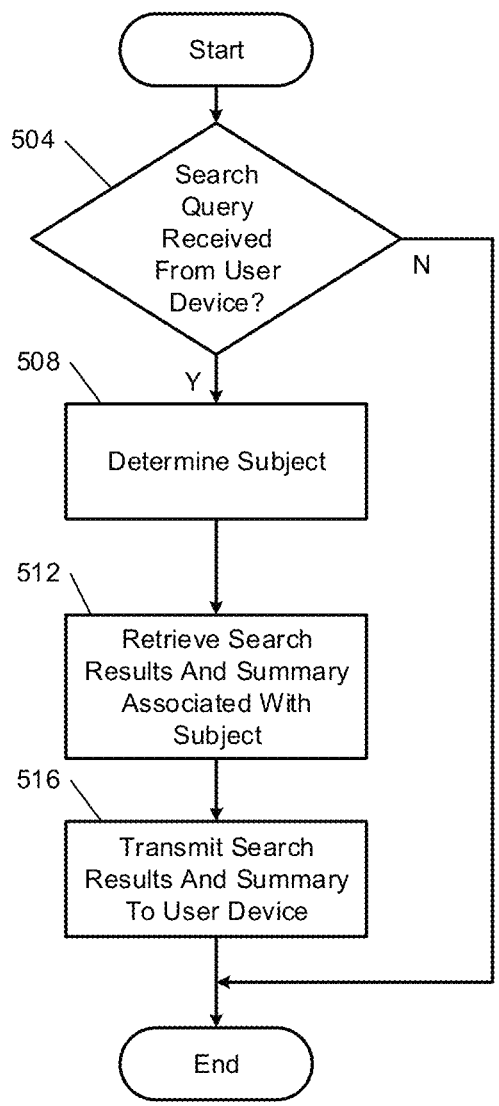
FIG. 5 includes a flowchart depicting an example method of receiving a query regarding a subject and providing a summary of sentences regarding aspects of the subject.

FIG. 5 includes a flowchart depicting an example method of receiving a query regarding a subject and providing a summary of sentences regarding aspects of the subject. The example of FIG. 5 may be performed by the search module 200. Control begins with 504 where the search module 200 receives a query from a computing device 104. At 508, the subject module 208 parses the query and determines the subject of the query.

At 512, the results module 212 retrieves the summary associated with the subject from the memory 216. The results module 212 may also retrieve other information associated with the subject, such as the documents used to create the summary, and other information stored in the memory 216 regarding the subject. At 516, the search module 200 transmits the search results (including the summary and other information obtained regarding the subject) to the computing device 104 from which the query was received. The computing device 104 outputs the received search results, such as visually via a display and/or audibly via a speaker. While the example of FIG. 5 is illustrated as ending, control may return to 504. Multiple instances of the example of FIG. 5 may be performed simultaneously.

Figure 6:
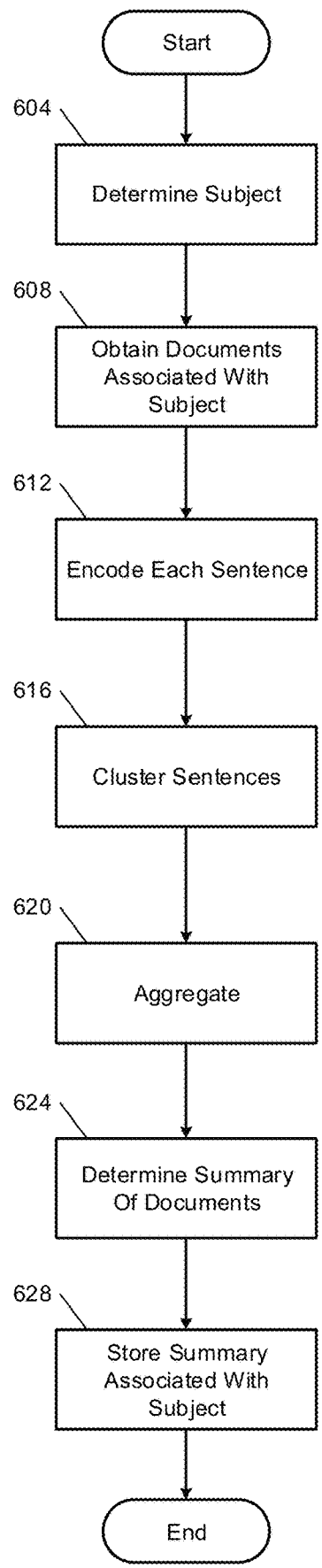
FIG. 6 is a flowchart depicting an example method of generating a summary for a subject based on multiple documents associated with the subject.

FIG. 6 is a flowchart depicting an example method of generating a summary for a subject based on multiple documents associated with the subject. Control begins with 604 where the acquisition module 304 determines a subject for which to generate a summary. The acquisition module 304 may, for example, select the subject randomly or from a list of subjects in a predetermined order. At 608, the acquisition module 304 obtains documents associated with the subject, such as from the memory 216.

At 612, the encoding module 308 encodes each sentence of each document using its computer model. At 616, the grouping module 312 clusters the sentences by aspect such that a cluster of sentences are associated with each aspect. At 620, the group representation module 316 aggregates the clusters of sentences to produce the representation for each aspect, as discussed above.

At 624, the summary module 320 generates the summary for the subject, as described above. The summary includes one sentence for each aspect. The summary module 320 generates the summary sentence for an aspect based on the representation for that aspect. The summary module 320 generates the summary using its computer model. The weights of the computer model of the summary module 320 are shared with the computer model of the encoding module 308. The weights are trained jointly.

At 628, the updating module 324 stores the summary in association with the subject in the memory 216. The summary can then be provided in response to a query including the subject in search results associated with the subject. While the example of FIG. 6 is illustrated as ending, control may return to 604 to generate a summary for another subject. Multiple instances of the example of FIG. 6 may be performed simultaneously.

Figure 7:
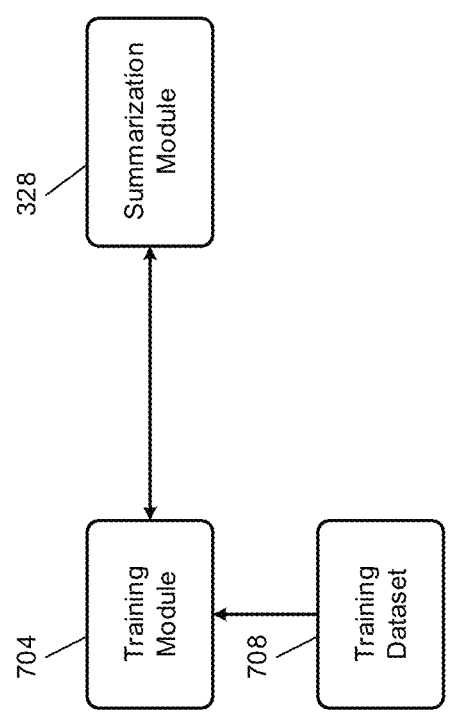
FIG. 7 is a functional block diagram of an example training system.

FIG. 7 is a functional block diagram of an example training system. A training module 704 trains the summarization module 328 using one or more training datasets, such as training dataset 708. The training by the training module 704 includes learning the computer models used by the encoding module 308 and the summary module 320 and the function $f_{aspect}$ used by grouping module 312. The training includes learning the weights of the computer models jointly during the training.

For example, the training module 704 may train the computer models used by the summarization module 328 using a multitask learning (MTL) objective. The training module 704 may jointly optimize the language modelling objective, as well as the two supervised classification tasks, aspect and polarity, as follows.

$$\mathcal{L}_{lm} = \sum_{i=1}^{n} -\log P(w_i | w_0^{i-1}; \theta_{LSTM}),$$

$$\mathcal{L}_{polarity} = -\log P(y_p | w_0^n; \theta_{LSTM}, \theta_{polarity}),$$

$$\mathcal{L}_{aspect} = -\log P(y_a | w_0^n; \theta_{LSTM}, \theta_{aspect}),$$

$$\mathcal{L}_{MTL} = \mathcal{L}_{lm} + \mathcal{L}_{polarity} + \mathcal{L}_{aspect},$$

where $w_0^n$ is a sentence, $y_p$ is its polarity label, and $y_a$ is its aspect label. In various implementations, the training module 704 may optimize only the language modelling objective (i.e., optimize $\mathcal{L}_{lm}$ instead of $\mathcal{L}_{MTL}$). While the example of a MTL objective is provided, aspect and polarity annotations for the input summaries may not be used, and a smaller number of annotated examples may be used for training.

The training dataset 708 may include, for example, the Oposum dataset. This dataset includes Amazon reviews for 6 types of products extracted from the Amazon Product Dataset. For each product type, small subsets of reviews are annotated with aspects (e.g., 1400 sentences), polarities (e.g., 330 sentences), and gold summaries (e.g., 10 summaries). A portion of the training dataset 708 may be held out during the training and used for testing. The polarity annotated sets may be split into a train set (e.g., 90%) and development set (10%).

Protocol and Hyperparameters

To optimize the language modeling objective, at each training step, a batch of sentences may be sampled and an update may be performed on the language modelling loss ($\mathcal{L}_{lm}$). Then a batch of sentences (from the annotated subset) may be sampled, and an update on one of the supervised classification losses ($\mathcal{L}_{polarity}$ on even steps, aspect $\mathcal{L}_{aspect}$ on odd steps) may be performed.

For the language computer model, a 2-layer monodirectional LSTM may be used with state size of 1000 and randomly initialized word embeddings of size 200. Mini-batches of size 10 may be used for the language modelling objective and size 8 for aspect and polarity classification.

For the k-means clustering method, the number of clusters may be set to 8. For the aspect-based a grid search may be performed over different pruning sizes (e.g., 16, 100). At inference time using top-k with re-ranking, the following settings may be used k=20 and K=10.

For each product type, the training process may be run with 2 different seeds and the inference process with 3 different seeds. The results reported are the mean and the standard deviation (std) of the 6 train/inference combinations.

Four variations of the language computer model are tested: No clustering, $\mathcal{L}_{lm}$ training objective: (Mean) the summary is generated from the centroid representation of all reviews; (Kmeans) K-means $\mathcal{L}_{lm}$ training objective; (Kmeans+MTL) K-means, $\mathcal{L}_{MTL}$ objective, this setting assesses whether k-means clustering provides better information when the LSTM is trained to incorporate aspect information in its representations (via MTL training); and (Aspect+MTL) aspect prediction clustering $\mathcal{L}_{MTL}$. The results are presented below in Tables 1 and 2 as computed using the py-rouge package implementation of ROUGE.

TABLE 1

ROUGE-L evaluation per product type.

| Model | Bags_and_cases | Bluetooth | Boots | Keyboards | TV | Vacuums |
|---|---|---|---|---|---|---|
| TextRank | 0.35 | 0.28 | 0.31 | 0.30 | 0.30 | 0.30 |
| Mean | 0.19 ± 0.01 | 0.17 ± 0.03 | 0.16 ± 0.03 | 0.19 ± 0.03 | 0.15 ± 0.02 | 0.16 ± 0.03 |
| Kmeans | 0.35 ± 0.008 | 0.33 ± 0.02 | 0.31 ± 0.009 | 0.363 ± 0.00 | 0.30 ± 0.016 | 0.32 ± 0.010 |
| Kmeans + MTL | 0.34 ± 0.008 | 0.33 ± 0.01 | 0.31 ± 0.011 | 0.358 ± 0.01 | 0.30 ± 0.020 | 0.32 ± 0.012 |
| Aspect + MTL | 0.35 ± 0.01 | 0.35 ± 0.011 | 0.33 ± 0.012 | 0.385 ± 0.01 | 0.33 ± 0.012 | 0.36 ± 0.01 |

TABLE 2

| Model | ROUGE-1 | ROUGE-2 | ROUGE-L |
| --- | --- | --- | --- |
| TextRank | 0.27 ± 0.02 | 0.03 ± 0.0 | 0.31 ± 0.02 |
| Mean | 0.13 ± 0.02 | 0.01 ± 0.01 | 0.17 ± 0.03 |
| Kmeans | 0.28 ± 0.02 | 0.03 ± 0.01 | 0.33 ± 0.02 |
| Kmeans + MTL | 0.28 ± 0.02 | 0.03 ± 0.01 | 0.33 ± 0.02 |
| Aspect + MTL | 0.30 ± 0.02 | 0.04 ± 0.01 | 0.36 ± 0.02 |
| (Angelidis and Lapata, 2018) | 0.44 | 0.21 | 0.43 |

ROUGE- {1, 2, L} metrics.

Clustering reviews and generating a review sentence per cluster (Kmeans) may provide a benefit over generating a full summary from the centroid of all reviews (Mean). Using K-means clustering with a model trained with multitask learning (Kmeans+MTL) may have little to no effect over the quality of the summaries. Clustering reviews based on the aspect classifier may provide an improvement (+1 to +4 ROUGE-L) over K-means clustering. This model may outperform a baseline (e.g., Textrank) on all metrics.

The above presents an unsupervised opinion summarization method involving language modelling and aspect-based clustering. Experimentation has showed the benefits of clustering review sentences into meaningful groups, before or instead of aggregating them into a single vector. Experimentation has also showed that incorporating aspect information, as predicted by a supervised classifier, is beneficial to opinion summarization, and leverages only a small amount of annotated data that is easier to acquire than parallel summarization data.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A multi-document summarization system comprising:
   an encoding module configured to receive multiple documents associated with a subject and including reviews of the subject and to, using a first model, generate vector representations for sentences, respectively, of the documents,
   wherein the subject includes at least one of a business, a product, and a point of interest;
   a grouping module configured to group first ones of the sentences associated with a first aspect into a first group and group second ones of the sentences associated with a second aspect into a second group,
   wherein the first and second aspects are different;
   a group representation module configured to generate a first vector representation based on the first ones of the sentences of the first group and a second vector representation based on the second ones of the sentences of the second group;
   a summary module configured to:
      using a second model:
         generate a first sentence regarding the first aspect based on the first vector representation; and
         generate a second sentence regarding the second aspect based on the second vector representation; and
      store a summary including the first and second sentences in memory in association with the subject.

2. The multi-document summarization system of claim 1 wherein:
   the grouping module is further configured to group third ones of the sentences associated with a third aspect into a third group,
   wherein the first, second, and third aspects are different;
   the group representation module is further configured to generate a third vector representation based on the third ones of the sentences of the third group; and
   the summary module is further configured to:
      using the second model:
         generate a third sentence regarding the third aspect based on the third vector representation; and
         generate a third sentence regarding the third aspect based on the third vector representation; and
      store the summary further including the third sentence.

3. The multi-document summarization system of claim 1 wherein the first model is a long short term memory (LSTM) model.

4. The multi-document summarization system of claim 1 wherein the second model is a long short term memory (LSTM) model.

5. The multi-document summarization system of claim 1 wherein the first and second models are long short term memory (LSTM) models.

6. The multi-document summarization system of claim 1 wherein weights of the first and second models are trained jointly.

7. A training system comprising:
   the multi-document summarization system of claim 1; and
   a training module configured to jointly train weights of the first and second models using based on a training dataset.

8. The multi-document summarization system of claim 1 wherein the grouping module is configured to:
   for a sentence, based on the vector representation of the sentence, determine first and second probabilities of the sentence being associated with the first and second aspects, respectively;
   when the first probability is greater than the second probability, group the sentence into the first group; and
   when the second probability is greater than the first probability, group the sentence into the second group.

9. The multi-document summarization system of claim 1 wherein the group representation module is configured to:
   for the first ones of the sentences, determine probabilities that the first ones of the sentences, respectively, reflect a sentiment regarding the first aspect;
   select a first k of the first ones of the sentences with the highest probabilities of reflecting the sentiment regarding the first aspect,
   where is an integer greater than one; and
   generate the first vector representation based on the first k ones of the first ones of the sentences.

10. The multi-document summarization system of claim 9 wherein the group representation module is further configured to:
   for the second ones of the sentences, determine probabilities that the second ones of the sentences, respectively, reflect a sentiment regarding the second aspect;
   select a second k of the second ones of the sentences with the highest probabilities of reflecting the sentiment regarding the second aspect; and
   generate the second vector representation based on the second k ones of the second ones of the sentences.

11. The multi-document summarization system of claim 1 wherein the first aspect includes one of price, quality, and ease of use.

12. A search system comprising:
the multi-document summarization system of claim 1; and
a search module that receives a query regarding the subject from a computing device over a network, that retrieves the summary associated with the subject from the memory, and that transmits the summary to the computing device over the network.

13. A system comprising:
the search system of claim 12; and
the computing device, wherein the computing device is configured to the summary.

14. The system of claim 13 wherein the computing device is configured to at least one of:
audibly output the summary via a speaker; and
visibly output the summary on a display.

15. The multi-document summarization system of claim 1 wherein:
the encoding module is further configured to receive second documents associated with a second subject that is different than the subject and to, using the first model, generate second vector representations for second sentences, respectively, of the second documents;
the grouping module is further configured to group third ones of the second sentences associated with the first aspect into a third group and group fourth ones of the second sentences associated with the second aspect into a fourth group;
the group representation module is further configured to generate a third vector representation based on the third ones of the second sentences of the third group and a fourth vector representation based on the fourth ones of the second sentences of the fourth group;
the summary module is further configured to:
using the second model:
generate a third sentence regarding the first aspect based on the third vector representation; and
generate a fourth sentence regarding the second aspect based on the fourth vector representation; and
store a second summary including the third and fourth sentences in the memory in association with the second subject.

16. A multi-document summarization method comprising:
receiving multiple documents associated with a subject and including reviews of the subject,
wherein the subject includes at least one of a business, a product, and a point of interest;
using a first model, generating vector representations for sentences, respectively, of the documents;
grouping first ones of the sentences associated with a first aspect into a first group;
grouping second ones of the sentences associated with a second aspect into a second group,
wherein the first and second aspects are different;
generating a first vector representation based on the first ones of the sentences of the first group and a second vector representation based on the second ones of the sentences of the second group;
using a second model:
generating a first sentence regarding the first aspect based on the first vector representation; and
generating a second sentence regarding the second aspect based on the second vector representation; and
storing a summary including the first and second sentences in memory in association with the subject.

17. The multi-document summarization method of claim 16 further comprising:
jointly training weights of the first and second models using based on a training dataset.

18. The multi-document summarization method of claim 16 further comprising:
receiving a query regarding the subject from a computing device over a network;
retrieving the summary associated with the subject from the memory; and
transmitting the summary to the computing device over the network.

19. A multi-document summarization system comprising:
a means for receiving multiple documents associated with a subject and including reviews of the subject and to, using a first model, generate vector representations for sentences, respectively, of the documents,
wherein the subject includes at least one of a business, a product, and a point of interest;
a means for grouping first ones of the sentences associated with a first aspect into a first group and grouping second ones of the sentences associated with a second aspect into a second group,
wherein the first and second aspects are different;
a means for generating a first vector representation based on the first ones of the sentences of the first group and a second vector representation based on the second ones of the sentences of the second group;
a means for:
using a second model:
generating a first sentence regarding the first aspect based on the first vector representation; and
generating a second sentence regarding the second aspect based on the second vector representation; and
storing a summary including the first and second sentences in memory in association with the subject.

20. A multi-document summarization method comprising:
(a) receiving multiple documents associated with a subject and including reviews of the subject,
wherein the subject includes at least one of a business, a product, and a point of interest;
(b) clustering sentences in the multiple documents by:
(b1) using a first model, generating vector representations for sentences, respectively, of the documents;
(b2) grouping first ones of the sentences associated with a first aspect into a first group; and
(b3) grouping second ones of the sentences associated with a second aspect into a second group,
wherein the first and second aspects are different;
(c) aggregating the clustered sentences by generating a first vector representation based on the first ones of the sentences of the first group and a second vector representation based on the second ones of the sentences of the second group;
(d) summarizing the multiple documents using a second model by:
(d1) generating a first sentence regarding the first aspect based on the first vector representation; and
(d2) generating a second sentence regarding the second aspect based on the second vector representation; and
(e) storing a summary including the first and second sentences in memory in association with the subject.

* * * * *